US009477019B2

(12) United States Patent
Li et al.

(10) Patent No.: US 9,477,019 B2
(45) Date of Patent: Oct. 25, 2016

(54) COLOR FILTER SUBSTRATE, DISPLAY DEVICE AND METHOD FOR MANUFACTURING A COLOR FILTER SUBSTRATE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jing Li, Beijing (CN); Changjiang Yan, Beijing (CN); Wenyu Zhang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 14/488,075

(22) Filed: Sep. 16, 2014

(65) Prior Publication Data
US 2015/0276999 A1 Oct. 1, 2015

(30) Foreign Application Priority Data
Mar. 28, 2014 (CN) .......................... 2014 1 0124402

(51) Int. Cl.
G02B 5/20 (2006.01)
G02B 26/02 (2006.01)

(52) U.S. Cl.
CPC ............. G02B 5/201 (2013.01); G02B 26/026 (2013.01)

(58) Field of Classification Search
CPC ................. H01L 2924/0002; H01L 2924/00; H01L 27/14603; H01L 27/14687; H01L 31/1013; G03F 7/00; G02B 5/201
USPC .............. 257/98, 99, 432, 678, 692
See application file for complete search history.

(56) References Cited

U.S. PATENT DOCUMENTS

2007/0090754 A1* 4/2007 Li et al. .......................... 313/506
2011/0109853 A1* 5/2011 Ge et al. ........................ 349/114
2012/0299170 A1* 11/2012 Kehrer ................ H01L 23/3107
257/673

FOREIGN PATENT DOCUMENTS

| CN | 101813849 A | 8/2010 |
| CN | 103135282 A | 6/2013 |
| CN | 103474452 A | 12/2013 |
| JP | H08-94992 A | 4/1996 |
| TW | 0200718273 A | 5/2007 |

OTHER PUBLICATIONS

First Office Action regarding Chinese application No. 201410124402.2, dated Jan. 12, 2016. Translation provided by Dragon Intellectual Property Law Firm.

* cited by examiner

Primary Examiner — Chuong A Luu
Assistant Examiner — Rodolfo Fortich
(74) Attorney, Agent, or Firm — Harness, Dickey & Pierce, P.L.C.

(57) ABSTRACT

The present invention relates to the field of displays and discloses a color filter substrate, a display device and a method for manufacturing a color filter substrate. The color filter substrate comprises: a transparent substrate; a light-electricity converting module, provided on the transparent substrate and configured to convert a light beam incident from the transparent substrate into electric energy. The display device comprises the color filter substrate. In the invention, a light-electricity converting module is set on a transparent substrate, thus a light beam incident from the transparent substrate may be converted into electric energy, so that the sunlight transmitted into a display panel may be transformed into electric energy; because the solar energy is abundant, it may meet the demand of the display panel, and the service time of the display panel may be prolonged.

9 Claims, 4 Drawing Sheets

COLOR FILTER SUBSTRATE, DISPLAY DEVICE AND METHOD FOR MANUFACTURING A COLOR FILTER SUBSTRATE

CROSS-REFERENCE TO RELATED APPLICATION

The present application claims priority to and incorporates by reference the entire contents of Chinese priority document 201410124402.2, filed in China on Mar. 28, 2014.

TECHNICAL FIELD

The present invention relates to the field of displays, and in particular, to a color filter substrate, a display device and a method for manufacturing a color filter substrate.

BACKGROUND

For the existing display devices, especially for such portable types as mobile phones, the screens are made lager and larger, the number of application software becomes greater and greater, and the power consumption is increased sharply, thereby they need to be charged everyday. It has been an ordinary phenomenon that a user dare not use the display device too often due to the fear of power-down.

Therefore, it has become an urgent problem to be solved in this field how to realize the self-charging of a display device in an idle stage.

SUMMARY

In order to solve the problem that the electric energy of an existing display cannot meet the demand of the display panel, the invention provides a color filter substrate, a display device and a method for manufacturing a color filter substrate.

The invention employs a technical solution as follows: a color filter substrate, comprising:
  a transparent substrate; and
  a light-electricity converting module, provided on the transparent substrate and configured to convert a light beam incident from the transparent substrate into electric energy.

The invention further provides a display device, comprising the color filter substrate.

The invention further provides a method for manufacturing a color filter substrate, comprising:
  forming a transparent substrate;
  forming, on the transparent substrate, a light-electricity converting module that converts a light beam incident from the transparent substrate into electric energy; and
  forming a black matrix and a color resist layer.

The present invention has the beneficial effects as follows: in the invention, a light-electricity converting module is set on a transparent substrate, thus a light beam incident from the transparent substrate may be converted into electric energy, so that the sunlight transmitted into a display panel may be transformed into electric energy; because the solar energy is abundant, it may meet the demand of the display panel, and the service time of the display panel may be prolonged.

DETAILED DESCRIPTION

In order to make the technical problems, the technical solutions and the advantages of the invention more apparent, a detailed description will be given below in conjunction with the drawings and specific embodiments.

Figure 1:
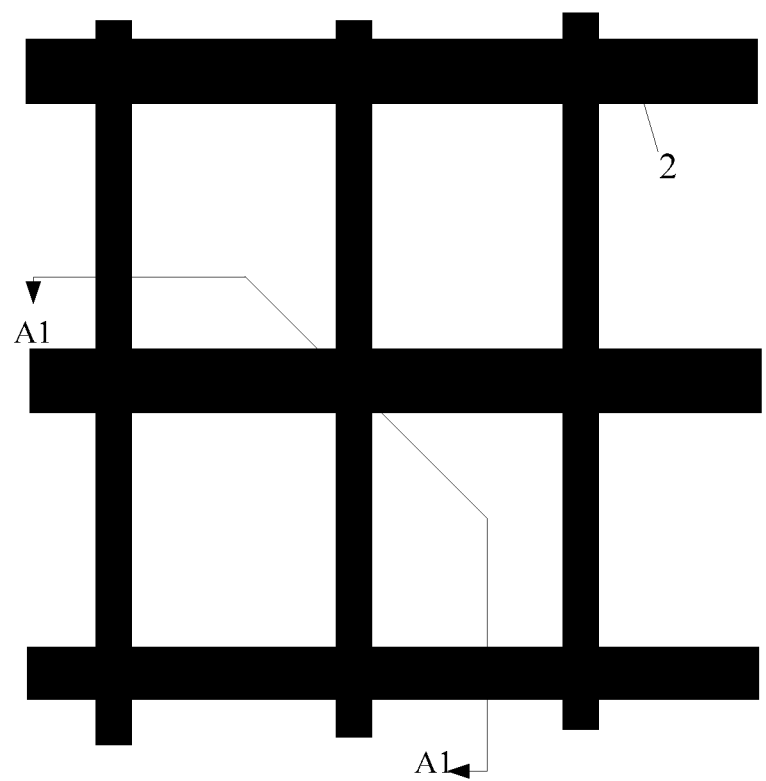
FIG. 1 is a structural representation of a color filter substrate according to one embodiment of the invention.
Figure 2:
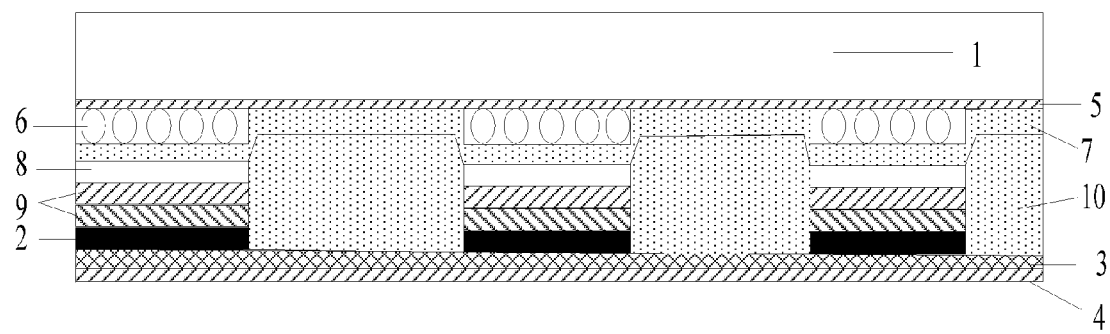
FIG. 2 is a sectional view taken along A1-A1 of FIG. 1.

FIG. 1 and FIG. 2 are structural representations of a color filter substrate according to one embodiment of the invention, wherein the color filter substrate may be employed to form a display panel with an array substrate, or an array may be set on the color filter substrate to form a display panel, which is not limited here.

In a embodiment, the color filter substrate comprises:
  a transparent substrate 1;
  a light-electricity converting module, provided on the transparent substrate 1 and configured to convert a light beam incident from the transparent substrate 1 into electric energy.

In the invention, a light-electricity converting module is set on a transparent substrate, thus a light beam incident from the transparent substrate may be converted into electric energy, so that the sunlight transmitted into a display panel may be transformed into electric energy; because the solar energy is abundant, it may meet the demand of the display panel, and the service time of the display panel may be prolong greatly.

In a embodiment, as shown in FIG. 2, the color filter substrate further comprises: a black matrix 2, provided on the transparent substrate 1, and configured to form a black matrix region, so that the transparent substrate may be partitioned into a light transmitting region and a light shielding region, wherein the light shielding region corresponds to the location of the black matrix; the light-electricity converting module is located between the black matrix 2 and the transparent substrate 1 and located in the region in which the black matrix exists. Because the light-electricity converting module is located in the region in which the black matrix exists and the region is a light shielding region, the aperture ratio of the display region will not be damaged.

In a embodiment, the color filter substrate further comprises a black matrix 2 formed of an opaque metal conducting layer, and the light-electricity converting module comprises:
  a transparent electrode 8, located between the transparent substrate 1 and the black matrix 2;
  a first electrode formed by the black matrix 2; and a PN junction 9 located between the transparent electrode 8 and the first electrode.

The light-electricity converting module of this embodiment is realized by employing a PN junction, and it may transform the sunlight entering via the transparent substrate into electric energy so as to meet the demand of the display. Of course, the light-electricity converting module of the invention may also be implemented by employing other structures that can convert light energy into electric energy.

Referring again to FIG. 2, the color filter substrate of the above embodiment further comprises:

a controllable barrier layer, located between the light-electricity converting module and the transparent substrate; and a control unit, configured to control the controllable barrier layer to convert between a non-opaque first state and an opaque second state.

The controllable barrier layer of this embodiment has a non-opaque first state and an opaque second state, and it is set between the light-electricity converting module and transparent substrate. When it is in the non-opaque first state, a light beam may enter the light-electricity converting module from the transparent substrate, so that the PN junction may generate electric energy. When it is in the opaque second state, no light beam can enter the light-electricity converting module, so that the PN junction does not work. In this embodiment, the controllable barrier layer may also be controlled via a control unit, so that the controllable barrier layer may switch between the first state and the second state. The control unit of this embodiment comprises a transparent switching layer 5, the transparent switching layer 5 is preferably formed of a transparent electrode and connected with the controllable barrier layer, for applying a driving signal to the controllable barrier layer.

Because the light beams that enter the PN junction may be controlled, it is possible to charge as required. When the display panel is in a non-working state or when the electric quantity of the driving power supply of the display panel is lower than a preset threshold, which is, for example, 5%-10% of the full electric quantity, the controllable barrier layer will be controlled in a non-opaque first state. When the display panel is in a display state, if the PN junction works, the display effect will be influenced; at this time, it requires that the PN junction stops working, and the controllable barrier layer may be set in the opaque second state. When the display panel is in a non-display state, if the PN junction works, the display effect will not be influenced, and the controllable barrier layer may be set in the non-opaque first state. When the electric quantity of the driving power supply of the display panel is lower than the preset threshold, considering that it is more urgent requirement to charge, the controllable barrier layer will be immediately set in the non-opaque first state so as to make the PN junction work.

Figure 3:
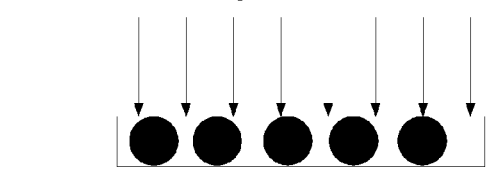
FIG. 3 is a schematic diagram showing the first state of the light-electricity converting module according to one embodiment of the invention.
Figure 3:
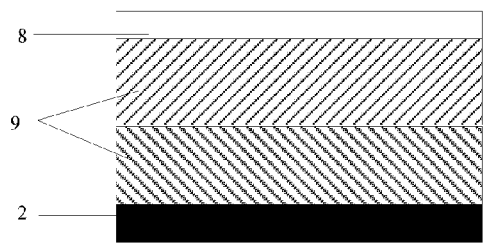
Figure 4:
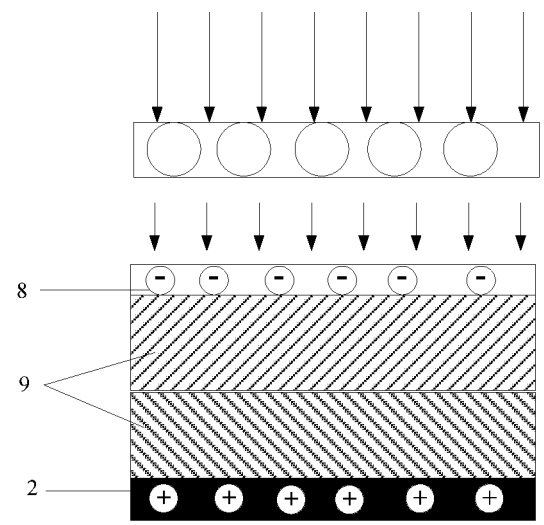
FIG. 4 is a schematic diagram showing the second state of the light-electricity converting module according to one embodiment of the invention.

FIGS. 3 and 4 show the process in which the light-electricity converting module of this embodiment generates electric energy. The PN junction generates electric charges due to light irradiation, and the electric charges are transferred and collected by the transparent electrode 8 and the first electrode respectively and charge the battery of the device directly. Because a black matrix is needed to form the first electrode, the black matrix is preferably made of a metal material. When in use, the color filter substrate of this embodiment may work by utilizing the electric energy. FIG. 3 shows a structural representation in which no electric energy is generated, wherein the controllable barrier layer is in the opaque second state, and the sunlight beam is sheltered by the controllable barrier layer after passing through the transparent substrate, and at this time, the PN junction does not work. FIG. 4 shows a structural representation in which electric energy is generated, wherein the controllable barrier layer is in the non-opaque first state, and the sunlight beam enters via the transparent substrate, and at this time, the PN junction works and generates positive and negative charges on the transparent electrode 8 and the black matrix 2 respectively, so that a voltage difference is generated between the transparent electrode and the black matrix, and electric energy may be thus output. The electrode on one side of the PN junction of this embodiment may be replaced by a black matrix, so that the processes and configured to form the electrodes may be reduced, and the process steps may be reduced. Of course, the first electrode may also be formed via a separate electrode layer, and at this time, a step of forming an electrode layer is needed additionally. At this time, the black matrix may not only be formed of a non-conducting material such as resin, but also be formed of a metal material.

Figures 5, 6:
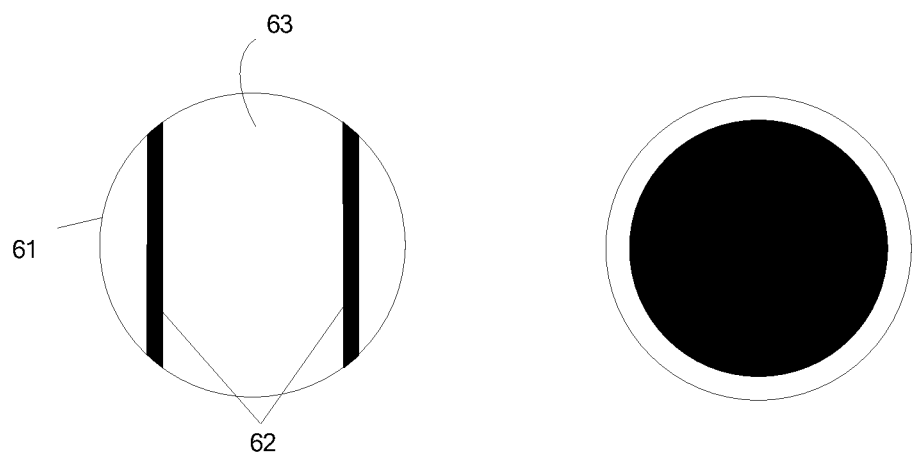
FIG. 5 is a schematic diagram showing the first state of a controllable barrier layer according to one embodiment of the invention.
FIG. 6 is a schematic diagram showing the second state of the controllable barrier layer according to one embodiment of the invention.

FIG. 5 and FIG. 6, show the structural representation of a controllable barrier layer according to one embodiment of the invention. The controllable barrier layer of this embodiment comprises an electronic ink layer 6, the electronic ink layer 6 is set between the transparent substrate and the light-electricity converting module. The electronic ink selects transmissive Gyricon multi-color balls, including transparent balls 61, two light-blocking layers 62 that are set apart among the transparent balls, and a channel 63 is formed between the two light-blocking layers. When the light-blocking layers are set in a first direction, they block the light beam from entering the PN junction, and when the light-blocking layers are set in a second direction, the channel between the two light-blocking layers may allow the light beam to enter or not enter the PN junction, so as to control the light beam to enter or not enter the PN junction. The electronic ink of this embodiment controls the light beam to enter or not enter the PN junction under the action of an electric field, and it is realized via directional rotation. When the transparent channel is set relative to the display region, the balls looks transparent; however, when the blocking layer is parallel with the display region, the balls looks black.

Referring to FIG. 2, the control unit of this embodiment comprises a transparent switching layer 5 connected with the electronic ink layer and configured to drive the electronic ink layer 6 to work correspondingly according to a voltage applied. The transparent switching layer 5 of this embodiment is set between the transparent substrate 1 and the electronic ink layer 6, for supplying a driving voltage to the electronic ink layer 6. In order to prevent the contact between the electronic ink layer 6 and the transparent electrode 8, a first insulating layer 7 is further formed therebetween. In this embodiment, a second insulating layer 10 is further formed between the black matrixes. The insulating layer may employ silicon oxide, or other insulating materials such as silicon nitride and hafnium oxide, etc. The transparent electrode 8 of this embodiment is set between the transparent substrate 1 and the PN junction 9 or between the PN junction and the black matrix, or it may be set as required. In this embodiment, a color resist layer 3 is further formed on the black matrix 2 so as to form a color filter layer. The color resist layer 3 of this embodiment is tiled on the black matrix, and the light transmitting region and the light shielding region are both formed with a color resist. However, the light shielding region may also be formed with a color resist, and the color resist in the region corresponding to the black matrix is etched off. After the color resist layer 3 is formed, a PI (guiding) layer 4 is further formed on the color resist layer 3. Generally, the color resist layer is RGB, and it may also be RGBW, RGBY and RGBYW, etc., which is not limited here.

The invention further provides a display device, which employs a color filter substrate according to any one of the above embodiments. The display device may be any product or component with a display function, for example, liquid crystal panel, electronic paper, mobile phone, tablet computer, TV set, display, notebook computer, digital photo frame and navigator.

Figure 7:
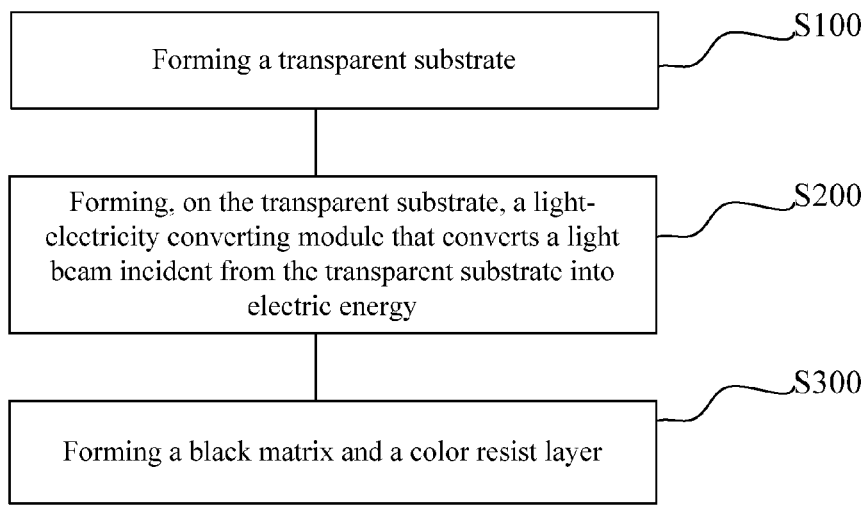
FIG. 7 is a flow chart of a method for manufacturing a color filter substrate according to one embodiment of the invention.

As shown in FIG. 7, in the first embodiment of the invention, the method for manufacturing a color filter substrate comprises the steps of:

Step S100: forming a transparent substrate;

Step S200: forming, on the transparent substrate, a light-electricity converting module that converts a light beam incident from the transparent substrate into electric energy; and Step S300: forming a black matrix and a color resist layer.

For the color filter substrate of the invention, a light-electricity converting module is set on a transparent substrate, thus a light beam incident from the transparent substrate may be converted into electric energy, so that the sunlight transmitted into a display panel may be transformed into electric energy; because the solar energy is abundant, it may meet the demand of the display panel, and the service time of the display panel may be prolonged.

In Step S200, the light-electricity converting module is set between the black matrix and the transparent substrate and located in the region in which the black matrix exists. Because the light-electricity converting module is located in the region in which the black matrix exists, the region will be a light shielding region, so that the aperture ratio of the display region will not be damaged.

The step in which the light-electricity converting module is set between the black matrix and the transparent substrate and located in the region in which the black matrix exists further comprises:

forming, on the transparent substrate, a transparent electrode that is located in the region in which the black matrix exists;

forming, on the transparent electrode, a PN junction that is located in the region in which the black matrix exists; and forming, on the PN junction, a black matrix consisted of an opaque metal conducting layer.

The transparent electrode and/or the PN junction are/is formed via a mask process the same as that of the black matrix.

The light-electricity converting module formed in another embodiment is consisted of a PN junction as well as a transparent electrode and a black matrix that are located on the two sides of the PN junction, wherein the transparent electrode and the PN junction are both formed in the region in which the black matrix exists, so that the PN junction and the transparent electrode formed will not influence the aperture ratio during displaying. In order to save the process, at least one of them is formed via a mask process the same as that of the black matrix, and a mask plate may be shared.

Figure 8:
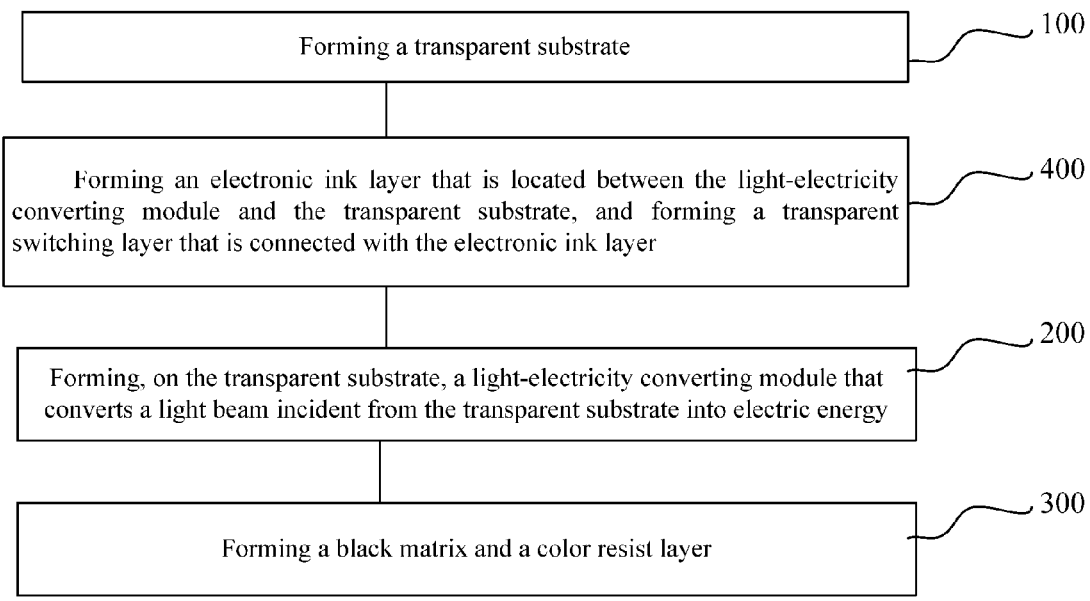
FIG. 8 is a flow chart of a method for manufacturing a color filter substrate according to the second embodiment of the invention.

As shown in FIG. 8, in the second embodiment of the invention, the method for manufacturing a color filter substrate is basically the same as the first embodiment, except that the method of this embodiment further comprises:

Step 400: forming an electronic ink layer that is located between the light-electricity converting module and the transparent substrate, and forming a transparent switching layer that is connected with the electronic ink layer.

The electronic ink layer and/or the transparent switching layer are/is located in the region in which the black matrix exists.

The method for manufacturing a color filter substrate of the invention will be illustrated in detail below in conjunction with a specific embodiment.

Step 1: A transparent electrode layer is deposited on a transparent substrate, and a layout pattern the same as the layout of a black matrix may be formed via a mask process, and preferably, and preferably, the material is ITO or IZO, etc.;

Step 2: An electronic ink is tiled on the substrate on which the above step has been performed, and a layout pattern the same as the layout of a black matrix is formed via a mask process, and preferably, the material is transmissive Gyricon multi-color ball;

Step 3: An insulating layer is deposited on the substrate on which the above steps have been performed, and preferably, the material is transparent and insulating silicon oxide, or an insulating material such as silicon nitride and hafnium oxide, etc., may be employed, or a multi-layer combination of the above various insulating materials;

Step 4: A transparent conducting layer is deposited on the substrate on which the above steps have been performed, and a layout pattern the same as the layout of a black matrix is formed via a mask process, and preferably, the material is ITO or IZO, etc.;

Step 5: A PN junction is deposited sequentially on the substrate on which the above steps have been performed, and a layout pattern the same as the layout of a black matrix is formed via a mask process, and preferably, the material is a doped amorphous semiconductor material;

Step 6: A black matrix is deposited on the substrate on which the above steps have been performed, and the corresponding layout pattern is formed via a mask process, and preferably, the material is a metal material with good opacity;

Step 7: An insulating layer is deposited on the substrate on which the above steps have been performed, and the corresponding layout pattern is formed via a mask process, for reducing the segment difference and providing a flat plane for the subsequent RGB deposition, and preferably, the material is transparent and insulating silicon oxide, or an insulating material such as silicon nitride and hafnium oxide, etc., may be employed, or a multi-layer combination of the above various insulating materials;

Step 8: The three colors of RGB 3 are sequentially deposited on the substrate on which the above steps have been performed, and the corresponding layout pattern is formed via a mask process; and Step 9: A PI (guiding) layer is coated on the substrate on which the above steps have been performed, and a groove required is formed by etching.

In the above technical solution, by setting a light-electricity converting module on a transparent substrate of a color filter substrate, a light beam incident from the transparent substrate may be converted into electric energy, so that the sunlight transmitted into a display panel may be transformed into electric energy; because the solar energy is abundant, it may meet the demand of the display panel, and the service time of the display panel may be prolonged.

The above specific implementation modes of the invention are only illustrative, rather than being limitative. Various variations may also be made by one skilled in the art in the light of the present method without departing from the spirit of the method and the protection scope of the claims, and all these variations pertain to the protection scope of the invention.

What is claimed is:

1. A color filter substrate configured to be assembled with an array substrate to form a display panel, wherein the color filter substrate comprises:
    a transparent substrate arranged toward eyes of a user using the display panel;
    a light-electricity converting module provided on the transparent substrate and configured to convert a light beam incident from the transparent substrate into electric energy;
    a controllable barrier layer located between the light-electricity converting module and the transparent substrate, and located in a region in which a black matrix exists; and
    a control unit configured to control the controllable barrier layer to convert between a non-opaque first state and an opaque second state,
    wherein the controllable barrier layer includes an electronic ink layer, and the electronic ink layer is set between the transparent substrate and the light-electricity converting module.

2. The color filter substrate according to claim 1, wherein the color filter substrate further comprises a black matrix, and the light-electricity converting module is located between the black matrix and the transparent substrate and located in a region in which the black matrix exists.

3. The color filter substrate according to claim 2, wherein the black matrix is formed of an opaque metal conducting layer.

4. The color filter substrate according to claim 1, wherein the light-electricity converting module comprises:
    a transparent electrode, located between the transparent substrate and a black matrix;
    a first electrode, formed by the black matrix; and
    a PN junction, located between the transparent electrode and the first electrode;
    wherein the first electrode formed by the black matrix and the transparent electrode are configured to collect electric charges generated by the PN junction through a light-electricity conversion.

5. The color filter substrate according to claim 4, wherein the black matrix is formed of a metal material.

6. The color filter substrate according to claim 1, wherein the control unit comprises a transparent switching layer connected with the electronic ink layer and configured to drive the electronic ink layer to work correspondingly according to a voltage applied.

7. The color filter substrate according to claim 2, wherein the control unit comprises a transparent switching layer connected with the electronic ink layer and configured to drive the electronic ink layer to work correspondingly according to a voltage applied.

8. The color filter substrate according to claim 4, wherein the control unit comprises a transparent switching layer connected with the electronic ink layer and configured to drive the electronic ink layer to work correspondingly according to a voltage applied.

9. A display device, comprising the color filter substrate according to claim 1.

* * * * *